United States Patent
Kim et al.

(10) Patent No.: US 8,836,954 B2
(45) Date of Patent: Sep. 16, 2014

(54) OPTICAL PROFILOMETER USING LIQUID CRYSTAL FABRY-PEROT TO PROJECT FRINGE PATTERN

(75) Inventors: Hak-Rin Kim, Daegu (KR); Chang-Sub Park, Busan (KR)

(73) Assignee: Kyungpook National University Industry-Academic Cooperation Foundation (KR)

( * ) Notice: Subject to any disclaimer, the term of this patent is extended or adjusted under 35 U.S.C. 154(b) by 870 days.

(21) Appl. No.: 13/005,117

(22) Filed: Jan. 12, 2011

(65) Prior Publication Data

US 2011/0205356 A1    Aug. 25, 2011

(30) Foreign Application Priority Data

Jan. 14, 2010 (KR) .................... 10-2010-0003499

(51) Int. Cl.
*G01B 11/02* (2006.01)
*G01B 11/25* (2006.01)
*H04N 7/18* (2006.01)

(52) U.S. Cl.
CPC . *G01B 11/25* (2013.01); *H04N 7/18* (2013.01)
USPC .............................. 356/511; 356/519; 356/604

(58) Field of Classification Search
CPC ............... G01B 11/2441; G01B 11/25; G01B 9/02047; G01B 11/167
USPC .......................... 356/603–605, 511, 519, 480
See application file for complete search history.

(56) References Cited

U.S. PATENT DOCUMENTS 5,146,293 A * 9/1992 Mercer et al. ................. 356/512
6,438,272 B1 * 8/2002 Huang et al. ................. 382/286

* cited by examiner

*Primary Examiner* — Hwa Lee
(74) *Attorney, Agent, or Firm* — Cantor Colburn LLP

(57) ABSTRACT

Provided is an optical surface profilometer. The optical surface profilometer includes a Fabry-Perot resonator into which liquid crystals are inserted, a light source which supplies coherent light to the Fabry-Perot resonator, and a convex lens which is disposed in an interference pattern emitting plane of the Fabry-Perot resonator, wherein the coherent light supplied from the light source is incident to the Fabry-Perot resonator, wherein, when the light is incident, the Fabry-Perot resonator emits an interference pattern generated in a resonance mode, and wherein the interference pattern is configured so that a number of circular fringes having the same center are disposed non-linearly. As a voltage is applied to the liquid crystal layer of the Fabry-Perot resonator, an effective refractive index is changed, so that a resonance mode condition of the Fabry-Perot resonator is changed. As a result, a diameter of the interference pattern is also changed. A 3D surface profile of the object is measured by measuring and analyzing the change of the interference patterns.

15 Claims, 12 Drawing Sheets

(a)  (b)  (c)  (d)

(a)        (b)

OPTICAL PROFILOMETER USING LIQUID CRYSTAL FABRY-PEROT TO PROJECT FRINGE PATTERN

This application claims priority to Korean Patent Application No. 10-2010-0003499, filed on Jan. 14, 2010, and all the benefits accruing therefrom under 35 U.S.C §119, the contents of which in its entirety are hereby incorporated by reference.

BACKGROUND OF THE INVENTION

1. Field of the Invention

The present invention relates to an optical surface profilometer and a surface profile measuring method using the optical surface profilometer, and more particularly to, a surface profilometer which generates a dynamic interference pattern by using a Fabry-Perot resonator into which liquid crystals are inserted and measures a 3D surface profile of an object by using the dynamic interference pattern and a surface profile measuring method using the surface profilometer.

2. Description of the Prior Art

A 3D surface profilometer is an apparatus for accurately measuring a depth profile of a surface of an object. The 3D surface profilometer has been used as an industrial test apparatus, a medical diagnosis apparatus, or the like. Particularly, an optical surface profilometer is an optical apparatus for measuring a profile, that is, 3D surface information of a surface of an object in a non-contact, non-destructive manner. FIG. 1 is a block diagram illustrating an overall configuration of an optical surface profilometer in the related art. FIG. 2 is a view illustrating sequential processes of acquiring a 3D surface map of an object in a general optical surface profilometer. Referring to FIGS. 1 and 2, in the aforementioned optical surface profilometer, an interference pattern including fringes is scanned on a surface of the object as illustrated in (a) of FIG. 2. As illustrated in (b) and (c) of FIG. 2, a degree of distortion of the interference pattern is analyzed, and thus, as illustrated in (d) of FIG. 2, the 3D surface map of the object is acquired.

FIGS. 3A and 3B are views illustrating examples of objects and fringe patterns on surfaces of the objects photographed by an optical surface profilometer in the related art.

Referring to FIG. 3A, in the case where an object has a depth difference of which the height is different from a period of the interference fringes as illustrated in the left picture, when a uniform interference pattern is illuminated on the surface of the object, the distortion of the interference pattern occurs in the portion where the height of the depth difference is different from the period of the interference fringes as illustrated in the right picture. However, referring to FIG. 3B, in the case where an object has a depth difference of which the height is equal to the period of the interference fringes as illustrated in the left picture, when the uniform interference pattern is illuminated on the surface of the object, a uniform interference pattern occurs as illustrated in the right picture, so that it is difficult to acquire 3D depth difference information of the object. In this manner, conventional optical surface profilometers have the $2\pi$-ambiguity problem caused by the periodicity of the interference pattern. In other words, there is a problem in that, if the step difference in the surface of the object is larger than one period ($2\pi$) of the interference fringes, it is difficult to accurately measure the 3D surface map.

In order to solve the aforementioned problem, various methods have been proposed. The most representative method among the method is to obtain a 3D surface profile by analyzing images while changing the phase of the scanned interference pattern. However, in this method, although a change of the surface profile of the object can be accurately measured, hardware units for forming multiple optical patterns need to be additionally provided, so that the size of the apparatus and the costs are increased. In addition, since the process of comparing the 3D profiles needs to be performed, the time taken to perform image processing is increased.

SUMMARY OF THE INVENTION

The present invention is to provide an optical surface profilometer which measures a surface profile of an object by generating and scanning a dynamic interference pattern by using a Fabry-Perot resonator into which liquid crystals are injected.

The present invention is also to provide an optical surface profilometer which measures a surface profile of an object by generating and scanning an interference pattern having gray levels by using a Fabry-Perot resonator into which liquid crystals are injected.

The present invention is also to provide a surface profile measuring method of extracting a more accurate surface profile of an object by using the aforementioned optical surface profilometers.

According to a first aspect of the present invention, there is provided an optical surface profilometer including: a Fabry-Perot resonator into which liquid crystals are inserted; a light source which supplies coherent light to the Fabry-Perot resonator; and a convex lens which is disposed in an interference pattern emitting plane of the Fabry-Perot resonator, wherein the coherent light supplied from the light source is incident to the Fabry-Perot resonator, wherein, when the light is incident, the Fabry-Perot resonator emits an interference pattern generated in a resonance mode, and wherein the interference pattern is configured so that a number of circular fringes having the same center are disposed non-linearly.

According to a second aspect of the present invention, there is provided an optical surface profile measuring method using a surface profilometer having a Fabry-Perot resonator into which liquid crystals are inserted, the method including the steps of: (a) photographing an interference pattern emitted from the Fabry-Perot resonator and projected on a reference surface to acquire a reference interference pattern in the state where no voltage is applied to the Fabry-Perot resonator, the reference surface being a flat surface disposed at a position separated by a predetermined distance from an emitting plane of the Fabry-Perot resonator; (b) allowing the reference interference pattern from the Fabry-Perot resonator to be scanned on the surface of the object and photographing an interference pattern projected on the surface of the object to acquired a projected interference pattern in the state where no voltage is applied to the Fabry-Perot resonator; (c) comparing the projected interference pattern and the reference interference pattern to detect distorted areas in which the projected interference pattern is different from the reference interference pattern; (d) obtaining difference values between the projected interference pattern and the reference interference pattern in the detected distorted areas; (e) calculating heights of the distorted areas by using the difference values; and (f) extracting the surface profile of the object according to the heights of the distorted areas.

According to a third aspect of the present invention, there is provided an optical surface profile measuring method using a surface profilometer having a Fabry-Perot resonator into which liquid crystals are inserted, the method including the steps of: (a) allowing a plurality of voltages to be sequentially applied to the Fabry-Perot resonator and photographing dynamic interference patterns corresponding to the applied voltages, which are emitted from the Fabry-Perot resonator and projected on a reference surface, to acquire reference interference patterns corresponding to the applied voltages; (b) sequentially applying a plurality of the voltages to the Fabry-Perot resonator to allow the reference interference patterns from the Fabry-Perot resonator to be sequentially scanned on the surface of the object and sequentially photographing interference patterns corresponding to the applied voltages, which are projected on the surface of the object, to acquires projected interference patterns; (c) comparing the projected interference patterns and the reference interference patterns with respect to the applied voltages to detect distorted areas in which the projected interference patterns are different from the reference interference patterns; (d) obtaining difference values between the projected interference pattern and the reference interference pattern in the detected distorted areas with respect to the applied voltages; (e) calculating heights of the distorted areas by using the difference values; and (f) extracting the surface profile of the object according to the heights of the distorted areas, so that the surface of the object is scanned.

DETAILED DESCRIPTION OF THE INVENTION

Optical Surface Profilometer

Hereinafter, a configuration and operations of an optical surface profilometer according to a preferred embodiment of the present invention will be described with reference to the attached drawings. In the optical surface profilometer according to the embodiment, an interference pattern including concentric circular fringes is scanned by using a Fabry-Perot resonator in which liquid crystals are injected, a movement of the interference pattern is induced by changing a resonance condition of the Fabry-Perot resonator, so that a dynamic interference pattern can be generated.

Figure 1:
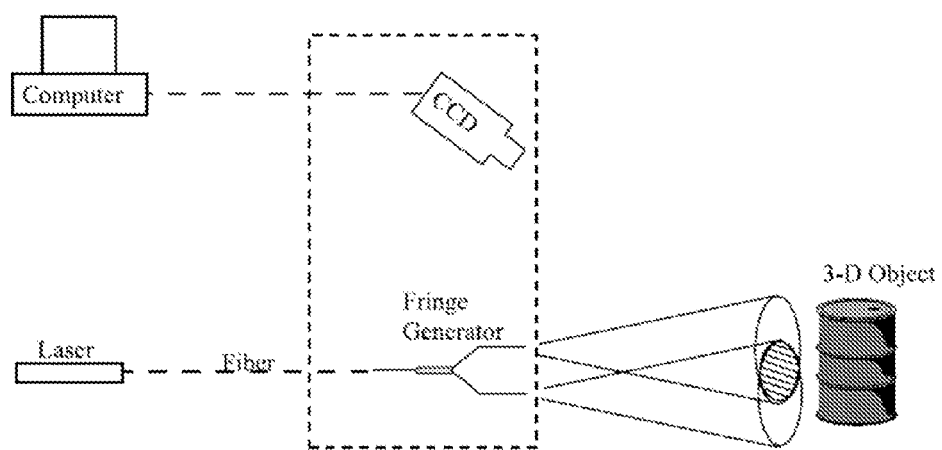
FIG. 1 is a block diagram illustrating an overall configuration of an optical surface profilometer in the related art.
Figure 2:
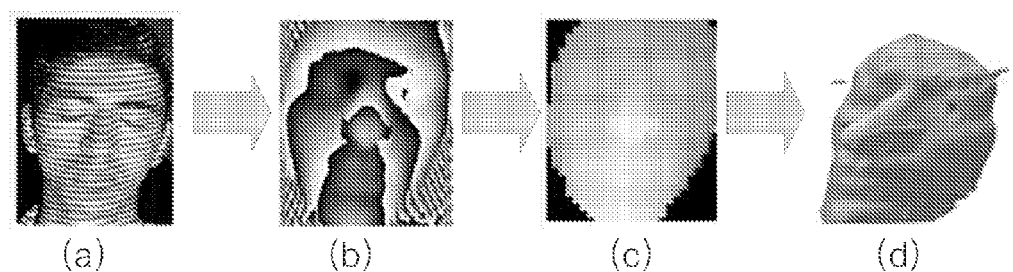
FIG. 2 is a view illustrating sequential processes of acquiring a 3D surface map of an object in a general optical surface profilometer
Figure 3A:
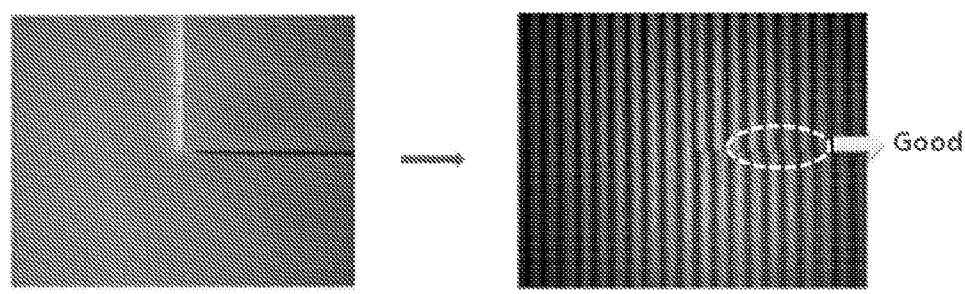
FIGS. 3A and 3B are views illustrating examples of the surface of the object having the depth difference and interference patterns on surfaces of the objects photographed by an optical surface profilometer in the related art.
Figure 3B:
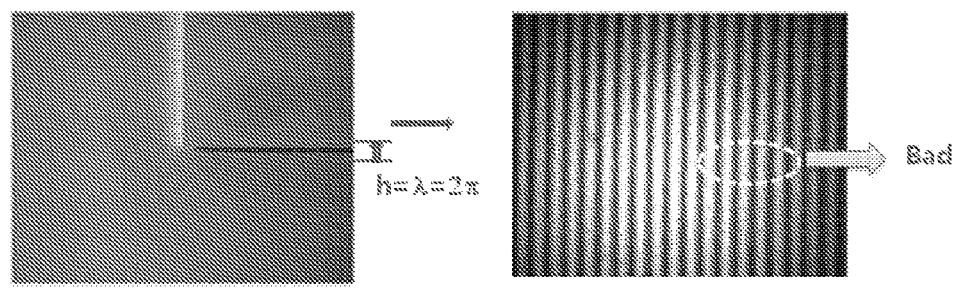
Figure 4:
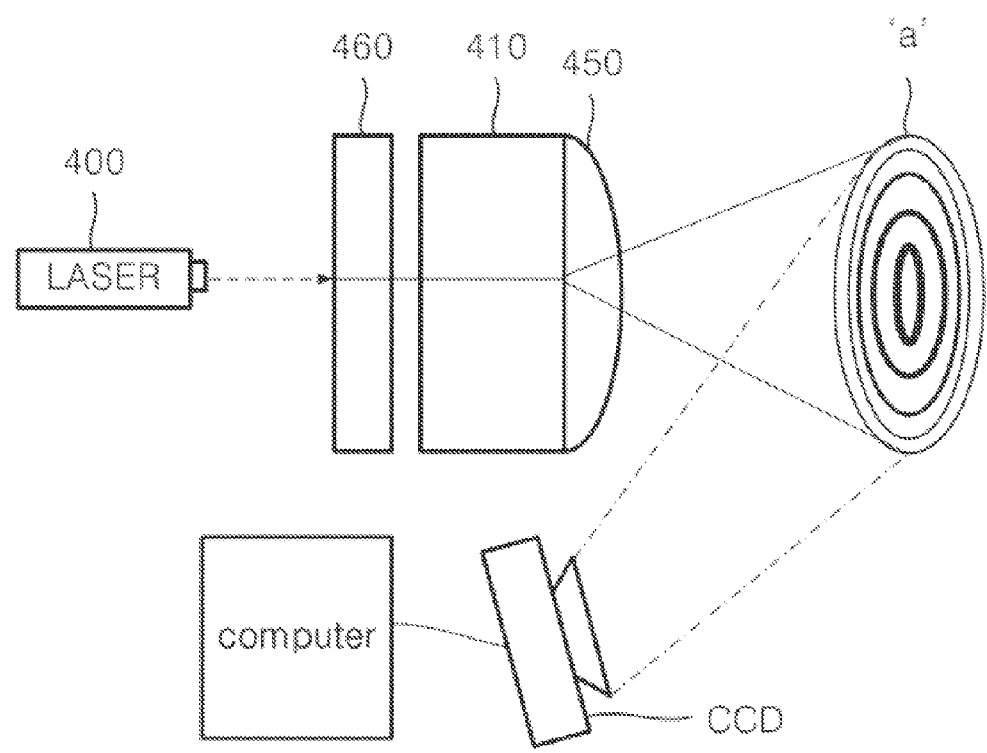
FIG. 4 is a diagram illustrating an overall configuration of an optical surface profilometer according to a first embodiment of the present invention.
Figure 5:
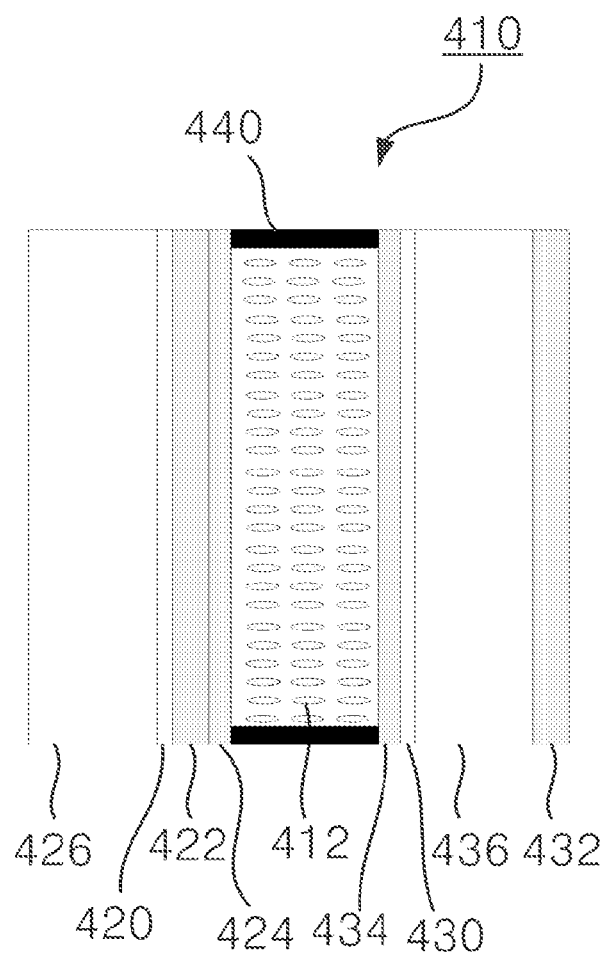
FIG. 5 is a cross sectional view illustrating a Fabry-Perot resonator of FIG. 4.

FIG. 4 is a diagram illustrating an overall configuration of the optical surface profilometer according to the preferred embodiment of the present invention. FIG. 5 is a cross sectional view illustrating a Fabry-Perot resonator 410 of FIG. 4. Referring to FIGS. 4 and 5, the optical surface profilometer 40 according to the embodiment includes a light source 400, a Fabry-Perot resonator 410, a convex lens 450, and a polarizer 460. Light illuminated from the light source 400 is emitted from the front surface of the convex lens 450 through the Fabry-Perot resonator 410, so that an interference pattern 'a' is generated. The interference pattern 'a' is configured with a number of circular fringes having the same center. Each of the fringes is non-periodically formed.

The light source 400 supplies coherent light. Laser or the like may be used as the light source 400.

The polarizer 460 is disposed between the light source 400 and the Fabry-Perot resonator 410 to determine the optical axis of the light emitted from the light source 400, which is incident to the Fabry-Perot resonator 410.

The convex lens 450 is disposed on the surface of the Fabry-Perot resonator 410 from which the interference pattern is emitted. A pattern illuminating area of a to-be-measured object is determined by adjusting a focal length of the convex lens 450. In addition, the number of sampling through the scanning is determined according to the focal length of the convex lens 450. The convex lens 450 collimates the interference pattern, which diverges after passing the Fabry-Perot resonator 410, so as to increase brightness of the interference pattern and to clarify the interference pattern.

The Fabry-Perot resonator 410 includes a liquid crystal layer 412 having a first side and a second side which face each other, a first vertical alignment layer 424, a first dielectric reflection film 422, a first transparent electrode layer 420, and a first substrate 426 which are disposed on the first side of the liquid crystal layer 412, a second vertical alignment layer 434, a second dielectric reflection film 432, a second transparent electrode layer 430, and a second substrate 436 which are disposed on the second side of the liquid crystal layer 412, and a spacer 440.

Since a resonance mode condition of the aforementioned Fabry-Perot resonator 410 is determined according to lengths of optical paths, the interference pattern projected on a flat surface is formed by the interference occurring in the inner portion of the Fabry-Perot resonator 410. At this time, the interference patterns are circular patterns having the same center. In addition, the resonance mode condition of the aforementioned Fabry-Perot resonator 410 can be electrically controlled by adjusting an effective refractive index of the liquid crystal layer 412. Therefore, as the diameters of the fringes included in the interference pattern are increased, the interference pattern scanned from the Fabry-Perot resonator 410 is changed.

The liquid crystal layer 412 is configured so that the first vertical alignment layer and the second vertical alignment layer are disposed at the two sides thereof and spacers 440 having a constant length are disposed in the ends of the first vertical alignment layer and the second vertical alignment layer. Therefore, the liquid crystal layer has a thickness equal to the length of the spacers. The liquid crystal layer is sealed by the first and second vertical alignment layers and the spacers, so that the inner portion of the liquid crystal layer is filled with liquid crystals.

Although any types of liquid crystals of which the alignment direction of directors is changed in response to an electric field can be used for the liquid crystal layer 412, a nematic liquid crystal is used in the present invention. It is preferable that the nematic liquid crystal has dielectric anisotropy. It is preferable that liquid crystal is disposed between the first and second vertical alignment layers 424 and 434. The refractive index $n_o$ of the liquid crystal is 1.4747, and the effective refractive index $n_e$ is 1.5571. In order to shorten a response time of the liquid crystal layer 412, it is preferable that a thickness $d_{LC}$ of the liquid crystal layer 412 is small. The thickness $d_{LC}$ of the liquid crystal layer 412 may be several micrometers (μm). It is preferable that the first and second substrates 426 and 436 are constructed with a glass substrate having a thickness $d_g$ of several hundred micrometers (μm) which is not influenced by an electric field. The first and second vertical alignment layers 424 and 434 are mechanically rubbed with anti-parallel directions.

The first and second transparent electrode layers 420 and 430 are transparent electrodes which apply voltage to the liquid crystal layer 412. The first and second transparent electrode layers 420 and 430 are disposed each on one of the side surfaces of the first and second vertical alignment films 424 and 434. The first and second transparent electrode layers 420 and 430 are formed by using a transparent oxide electrode material which is an electric conductor and has transparency to visible light. For example, the transparent oxide electrode material includes ITO (Indium Tin Oxide), IZO (Indium Zinc Oxide), $SnO_2$ (Tin Oxide), ATO (Antimony-doped Tin Oxide), FTO (Fluorine-doped Tin Oxide), indium oxide, zinc oxide, IGZO (Indium Gallium Zinc Oxide), cadmium oxide, phosphorus-doped tin oxide, ruthenium oxide, aluminum-doped zinc oxide, and the like. Particularly, the ITO film is most generally used as the aforementioned transparent oxide electrode material.

By changing the refractive index of the liquid crystal layer by applying a voltage to the liquid crystal layer through the first transparent electrode layer and the second transparent electrode layer, the resonance mode condition of the Fabry-Perot resonator 410 can be changed.

As the interval d between the first dielectric reflection film 422 and the second dielectric reflection film 432 is increased, the line width of each fringe of the interference pattern is decreased, so that the resolution of the surface profilometer is increased. Therefore, it is preferable that the first and second electrode layers, the liquid crystal layer, the first and second vertical alignment layers and at least one of the first substrate and the second substrate are disposed between the first dielectric reflection film and second dielectric reflection film, so that the interval between the first dielectric reflection film and the second dielectric reflection film can be maintained to be large. In addition, the reflectance of the first dielectric reflection film and the second dielectric reflection film is maintained to be 95% or more, so that the interference patterns including fringes having such a small line width as illustrated in FIG. 6B are configured.

Figure 6A:
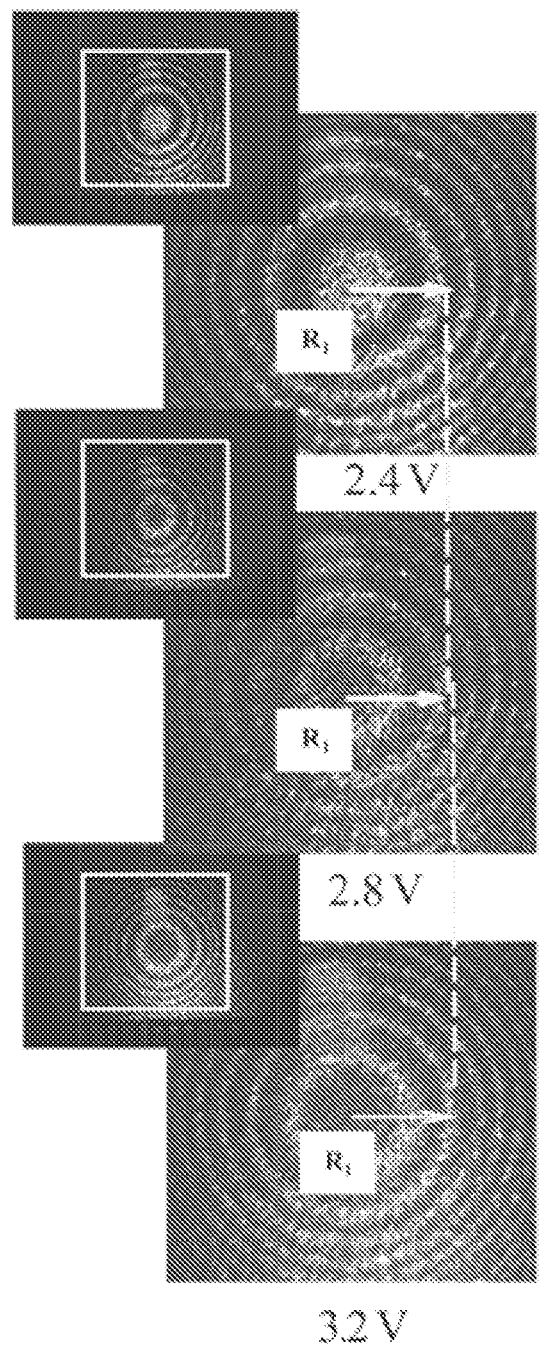
FIGS. 6A and 6B are views illustrating photographed images of interference patterns generated according to applied voltages (2.4 Volt, 2.8 Volt, and 3.2 Volt) in the optical surface profilometer according to the first embodiment of the present invention.
Figure 6B:
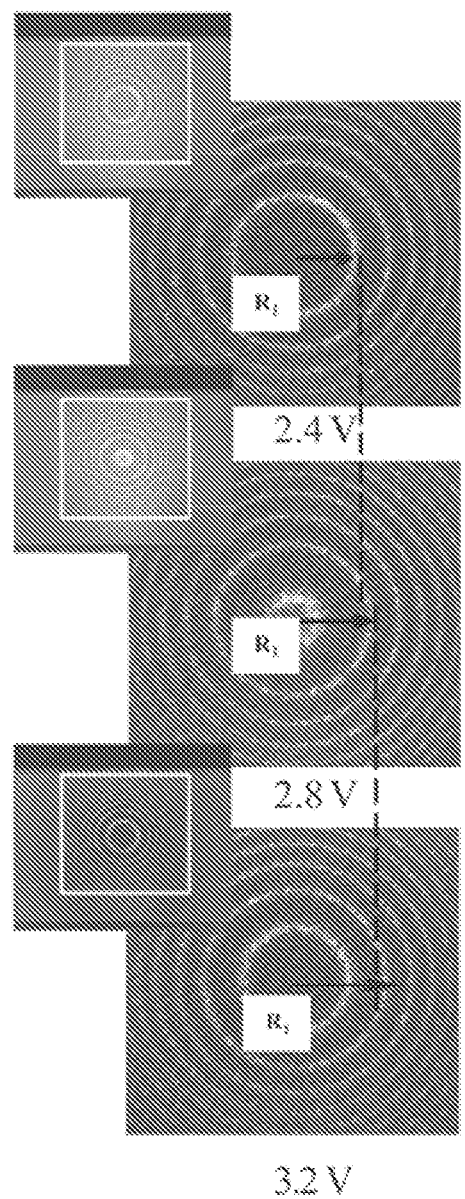

On the other hand, in a surface profilometer according to another embodiment of the present invention, the reflectance of the first dielectric reflection film and the second dielectric reflection film is maintained to be 50% or less, so that the interference patterns including fringes having such a large line width as illustrated in FIG. 6A are configured.

In the surface profilometer having the aforementioned configuration, in the state where no voltage is applied to the Fabry-Perot resonator 410, if a light beam of a coherent light source is incident on the Fabry-Perot resonator 410, an interference pattern is generated and scanned. The interference pattern includes concentric circular fringes which are non-periodically disposed (non-periodic concentric circular interference patterns).

On the other hand, if a voltage is applied to the Fabry-Perot resonator 410, the effective refractive index is changed, so that the resonance mode condition of the Fabry-Perot resonator 410 is also changed. In this manner, as the resonance mode condition of the Fabry-Perot resonator 410 is changed, the radii $R_1$ of the circular fringes included in the interference pattern are also changed. FIGS. 6A and 6B are views illustrating photographed images of the interference patterns generated according to the applied voltages (2.4 Volt, 2.8 Volt, and 3.2 Volt). Referring to FIGS. 6A and 6B, it can be understood that, as the voltage applied to the Fabry-Perot resonator 410 is increased, the radii of the circular fringes included in the interference pattern are increased.

The surface profilometer 40 may further include a control module 470 and an image pickup unit 480. The image pickup unit 480 photographs the interference patterns and supplies the interference patterns to the control module 470. The control module 470 controls the driving of the power supply unit of the Fabry-Perot resonator 410, the light source, and the image pickup unit 480 and detects the surface profile of the object based on the interference patterns supplied from the image pickup unit 480. The control module 470 may be embodied by using a computer or the like. The control module 470 may measure the surface profile of the object in a scanning type or a single scanning type. Hereinafter, the two types of the surface profile measuring methods of the control module 470 will be described in detail.

Scanning Type Surface Profile Measuring Method

Hereinafter, a scanning type surface profile measuring method for measuring a 3D surface profile by using the surface profilometer having the aforementioned configuration is described in detail. The scanning type surface profile measuring method using a surface profilometer according to the preferred embodiment of the present invention is adapted to a surface profilometer in which the reflectance of a dielectric reflection film of a Fabry-Perot resonator is 95% or more so that circular fringes of an interference pattern have a small line width. Therefore, in the scanning type surface profile measuring method according to the embodiment, sequentially increased voltages are applied to the Fabry-Perot resonator, so that dynamic interference patterns are sequentially scanned. The dynamic interference patterns projected on a surface of an object are sequentially photographed, so that the surface of the object is scanned. A degree of distortion of the projected interference patterns is measured, so that the surface profile of the object is measured.

Figure 7:
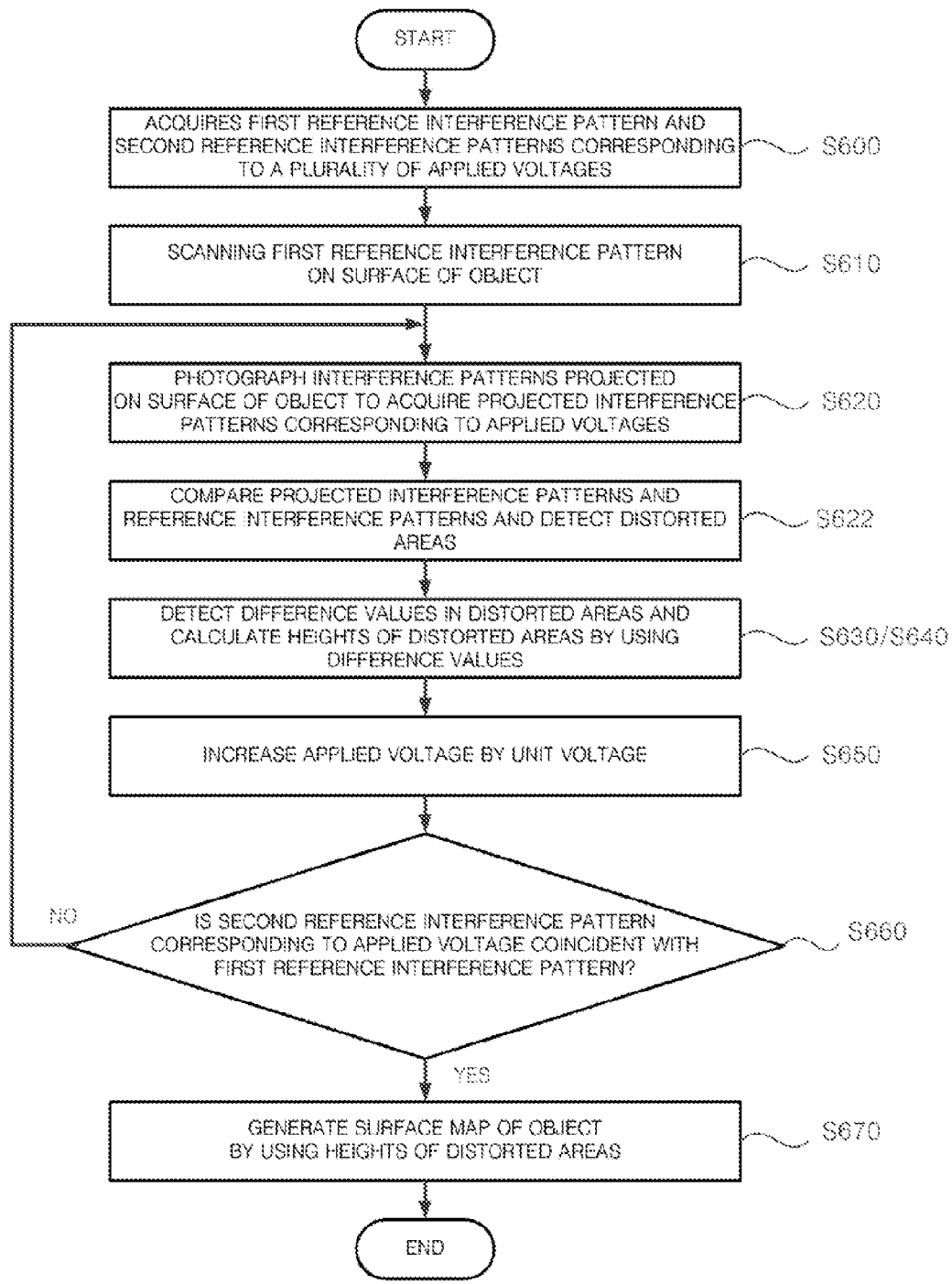
FIG. 7 is a flowchart sequentially illustrating a scanning type surface profile measuring method according to a second embodiment of the present invention.

FIG. 7 is a flowchart sequentially illustrating a scanning type surface profile measuring method using the surface profilometer according to the preferred embodiment of the present invention. Referring to FIG. 7, a first reference interference pattern is photographed in the state where no voltage is applied to the Fabry-Perot resonator or in the state a predetermined reference voltage is applied thereto; after that, second reference interference patterns are photographed with respect to voltages which are sequentially increased by unit voltage are applied; and the obtained first and second interference patterns are stored and managed (Step S600). Now, the process of acquiring the first reference interference pattern and the second reference interference patterns with respect to the applied voltages are described in detail. In the state where no voltage is applied to the liquid crystal layer of the Fabry-Perot resonator or in the state where a predetermined reference voltage is applied thereto, the first reference interference pattern is acquired by photographing the interference pattern projected on a flat reference surface separated by a predetermined distance from the Fabry-Perot resonator. Next, the second reference interference patterns corresponding to the applied voltages are acquired by photographing the interference patterns projected on the flat surface separated by the predetermined distance from the Fabry-Perot resonator while sequentially applying the voltages of which are increased by a predetermined unit voltage. Herein, the magnitude of the unit voltage is determined according to the resolution required in the application field of the surface profilometer. As the required resolution is increased, the magnitude of the unit voltage is decreased. Hereinafter, for the convenience of description in the specification, the photographed interference pattern which is emitted from the Fabry-Perot resonator and projected on the reference surface is referred to as a reference interference pattern, the photographed interference pattern which is emitted from the Fabry-Perot resonator and projected on the surface of the object is referred to as a projected interference pattern.

In the case of measuring the surface of the object, first, no voltage or a predetermined voltage which is a reference voltage or less is applied to the liquid crystal layer of the Fabry-Perot resonator, so that the reference interference pattern is scanned on the surface of the object (Step S610). Next, by photographing an image of the interference pattern projected on the surface of the object, the projected interference pattern according to the applied voltage is acquired (Step S620).

Next, by comparing the projected interference pattern acquired from the photographed image with the reference interference pattern emitted from the Fabry-Perot resonator, distorted areas in which the projected interference pattern is different from the reference interference pattern are detected in (Step S622). Next, with respect to the distorted areas, a difference value between the projected interference pattern and the reference interference pattern is detected (Step S630), and a height of a position in the surface of the object where the interference pattern is projected is extracted using the difference value (Step S640).

Figure 8:
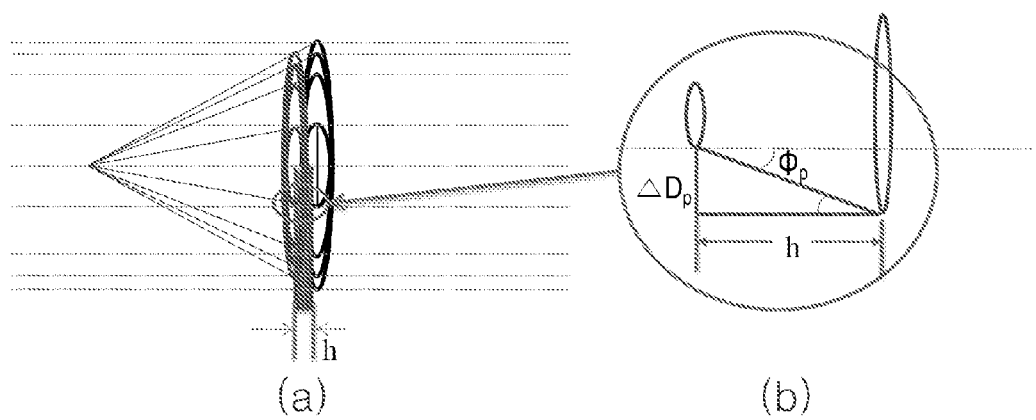
FIG. 8 is a view for explaining a process of calculating a height at a position of a surface of an object based on a difference value between a projected interference pattern and a reference interference pattern according to the second embodiment of the present invention.

Now, the process of calculating the height h of a position in the surface of the object based on the difference value between the projected interference pattern and the reference interference pattern is described in detail with reference to FIG. 8. FIG. 8 is a view for explaining the process of calculating the height of a position of the surface of the object based on the difference value between the projected interference pattern and the reference interference pattern. In the case where the heights of the positions in the surface of the object are different, the diameter of the projected interference pattern is changed according to the position in the surface of the object. Therefore, as illustrated in (a) of FIG. 8, in a specific area of the object where there is a step difference having a arbitrary height h from the reference surface, the diameters of the interference pattern projected on the surface of the object are different from the diameter of the reference interference pattern. (b) of FIG. 8 diagrammatically illustrates the height h of the depth difference according to a difference between the diameters of the interference pattern. Referring to (b) of FIG. 8, the height h of the depth difference occurring at a specific position in the surface of the object can be calculated by using the difference value between the reference interference pattern and the projected interference pattern as the following Equation 1.

$$h = \Delta D_p \cot(D_{p,reference}/2f)$$ [Equation 1]

Herein, $\Delta D_p = (D_{p,reference} - D_{p,measure})/2$; $D_{p,reference}$ is the diameter of the reference interference pattern; and $D_{p,measure}$ is the diameter of the projected interference pattern. In addition, f is the focal length of the convex lens.

Next, while sequentially increasing the applied voltage of the Fabry-Perot resonator by a predetermined unit voltage, the aforementioned Steps S620 to S640 are repetitively performed with respect to each applied voltage, so that the surface of the object is scanned (Step S650). In this case, as the voltages applied to the Fabry-Perot resonator are sequentially increased, the effective refractive index of the liquid crystal layer is changed according to the voltage. As a result, the circular fringes included in the projected interference pattern are shifted from the center of the interference pattern outwards, so that the diameters of the fringes are increased. Therefore, as the magnitude of the unit voltage is set to be small, the resolution of the projected interference pattern over the scanned surface is improved.

Figure 10:
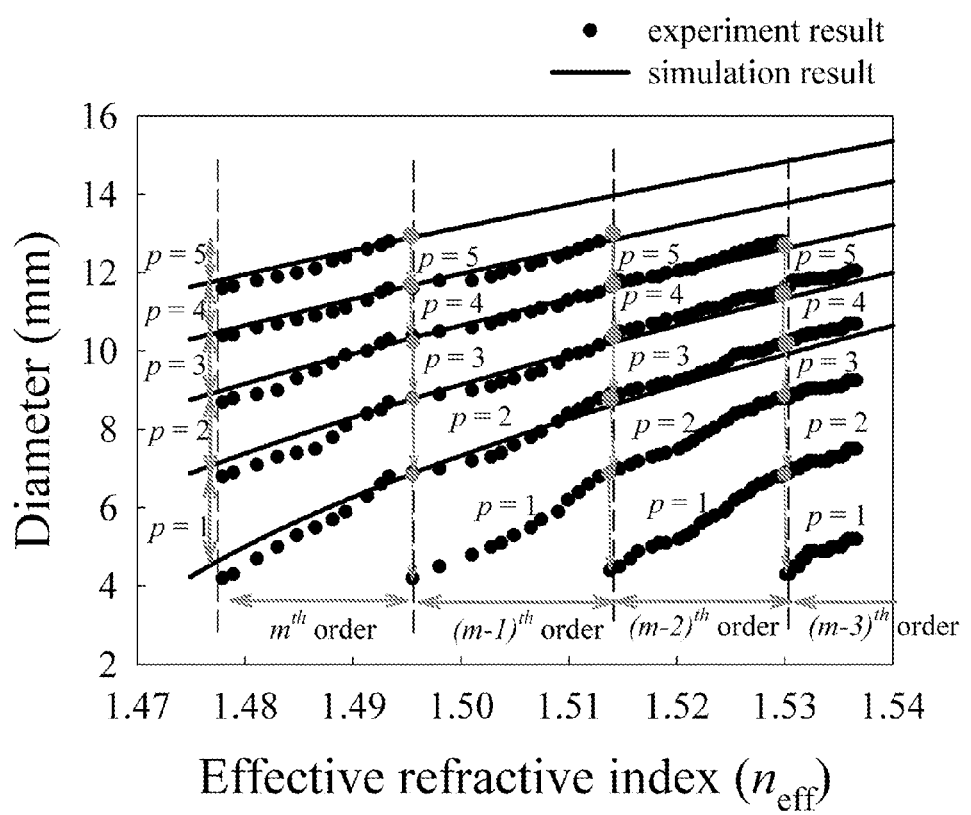
FIG. 10 is a graph illustrating a relationship between an effective refractive index $n_{eff}$ of a liquid crystal layer and a diameter of an interference pattern.
Figure 11A:
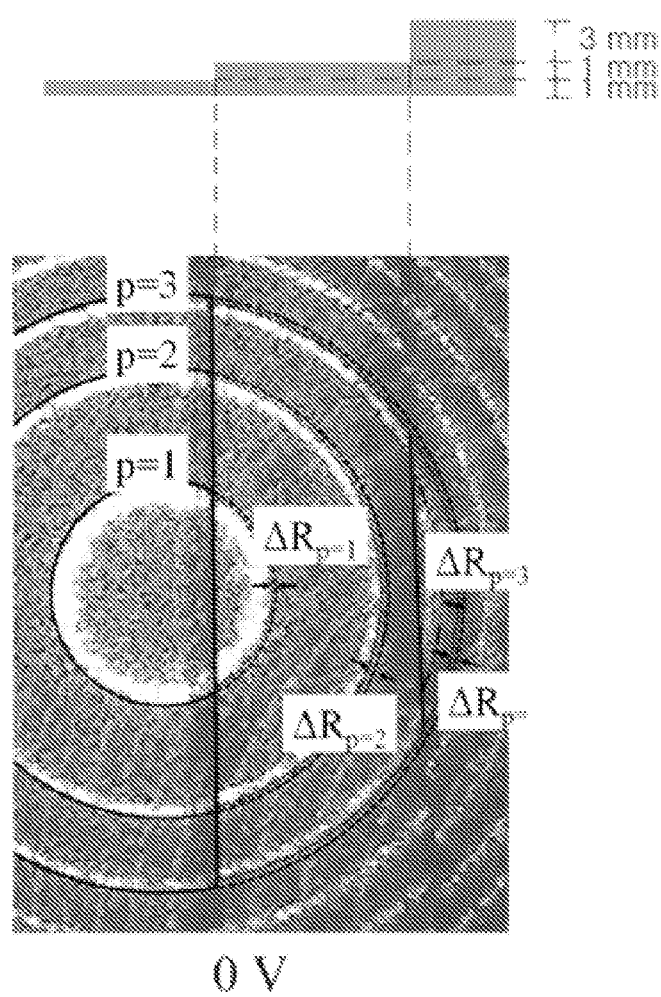
FIGS. 11A and 11B are views for explaining a change of the interference pattern according to a step difference in a surface of the object according to the second embodiment of the present invention.
Figure 11B:
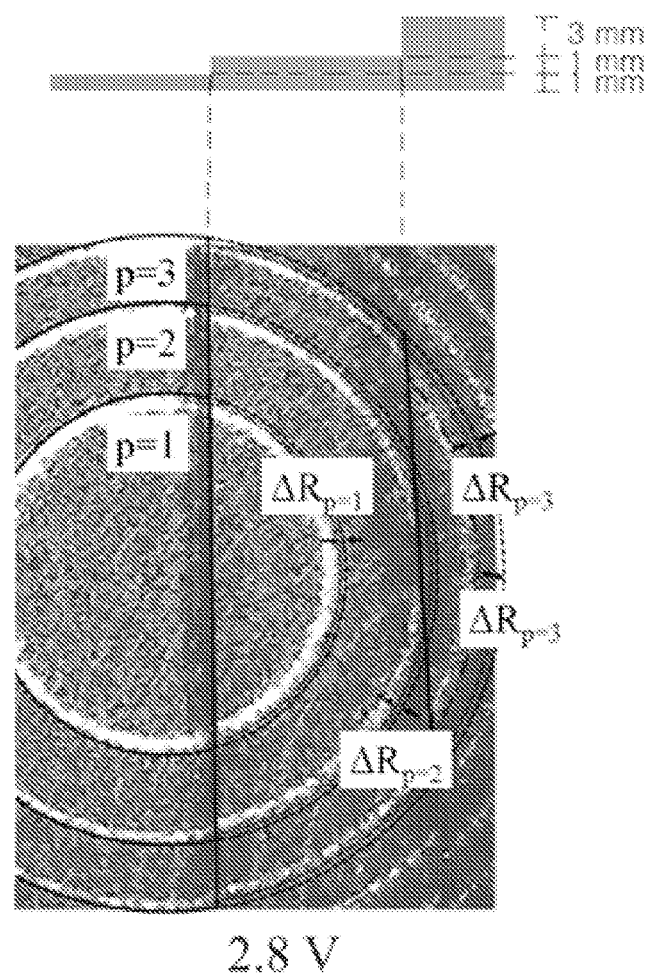

On the other hand, FIG. 10 is a graph illustrating a relationship between an effective refractive index $n_{eff}$ of a liquid crystal layer and a diameter of an interference pattern. If the voltage applied to the liquid crystal layer is increased, the effective refractive index of the liquid crystal layer is also increased in proportion to an increase in the applied voltage. Therefore, it can be understood with reference to FIG. 10 that the diameter of the fringes in the interference pattern is increased according to an increase in the voltage applied to the Fabry-Perot resonator. In FIG. 10, p denotes the order of the fringe in the interference pattern. It can be understood with reference to FIG. 10 that the phenomena that the diameter of the fringe is increased are periodically repeated as the voltage is increased. Therefore, the interference pattern in the state where the voltage corresponding to one period is increased is coincident with the interference pattern in the state where no voltage is applied. Therefore, if the fringes of the interference pattern in the state where the increased voltages are applied are coincident with a portion of the fringes of the interference pattern in the state where no voltage is applied (Step S660), the scanning process is ended. The diameter $D_{p,measure}$ in Equation 1 is expressed by the radii $R_{p,measure}$ measured in FIGS. 11A and 11B. As illustrated in FIGS. 11A and 11B, if a depth difference larger than the distance determined by the reference radius $R_{p,reference}$ a difference in the distance of the fringe in the interference pattern is generated by $\Box R_p$. By inserting these values into Equation 1, depth difference information, that is, the height h can be obtained. In FIGS. 11A and 11B, the size of the depth difference calculated from the distance difference $\Box R_1$ of the first ring and the size of the depth difference calculated from the distance difference $\Box R_2$ of the second ring are the same as 1 mm, and the size of the depth difference calculated from the distance difference $\Box R_3$ of the first ring is 4 mm. Since the depth difference information can be obtained from only the area where a ring exists, the ring is allowed to be shifted by changing the voltage, so that the depth difference information at each point can be obtained as illustrated in FIG. 11B.

In the surface profile measuring method according to the embodiment, it is possible to accurately measure the 3D surface profile by scanning the surface of the object through the aforementioned processes.

Single Scanning Type Surface Profile Measuring Method

Hereinafter, a single scanning type surface profile measuring method for measuring a 3D surface profile by using the surface profilometer having the aforementioned configuration is described in detail. In the single scanning type surface profile measuring method using a surface profilometer according to the preferred embodiment of the present invention is adapted to a surface profilometer in which the reflectance of a dielectric reflection film of a Fabry-Perot resonator is 50% or less so that circular fringes of an interference pattern have a large line width. Therefore, in the single scanning type surface profile measuring method according to the embodiment, in the state where a predetermined reference voltage is applied to the Fabry-Perot resonator or in the state where no voltage is applied thereto, a reference interference pattern is scanned. The interference pattern formed by projecting the reference interference pattern on the surface of the object is photographed. A degree of distortion of the projected interference pattern is measured, so that the surface profile of the object is measured.

The interference pattern formed by the Fabry-Perot interferometer can be generally expressed by an Airy function. As the reflectance is decreased, the Airy function is approximate to a sine or cosine function. Therefore, in the method according to the embodiment, it is preferable that the interference pattern has a line width changing periodically.

Figure 9:
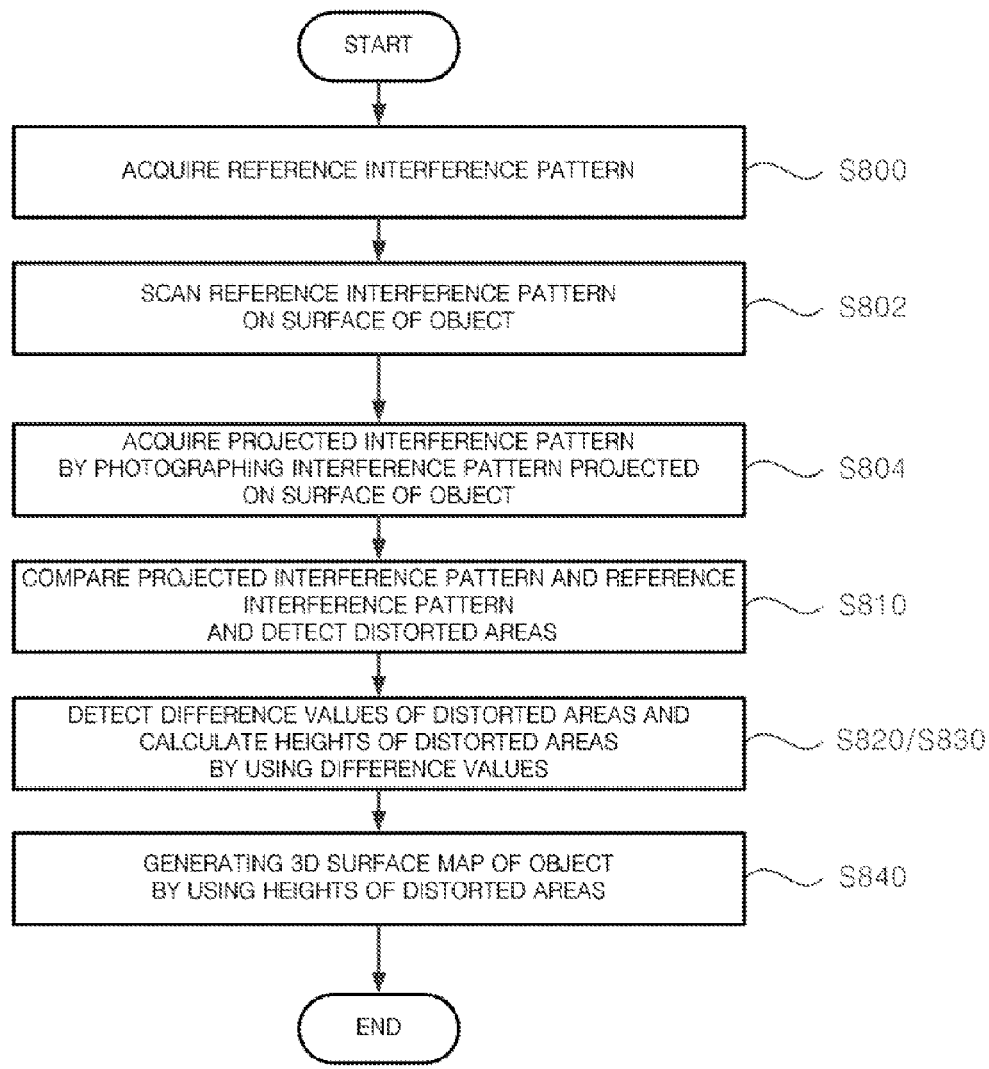
FIG. 9 is a flowchart sequentially illustrating a scanning type surface profile measuring method according to a third embodiment of the present invention.

FIG. 9 is a flowchart sequentially illustrating another embodiment of a scanning type surface profile measuring method using the surface profilometer according to the preferred embodiment of the present invention. Referring to FIG. 9, the interference pattern projected to the flat reference surface is photographed in the state where no voltage is applied to the Fabry-Perot resonator or in the state a predetermined voltage is applied thereto, so that the reference interference pattern is acquired (Step S800).

Next, by comparing the projected interference pattern acquired from the photographed image with the reference interference pattern emitted from the Fabry-Perot resonator, distorted areas where the projected interference pattern and the reference interference pattern are different from each other are detected (Step S810). With respect to each of the detected distorted areas, a difference values between the projected interference pattern and the reference interference pattern is detected (Step S820), and a height of a position in the surface of the object, on which the interference pattern is projected, is calculated using the difference value (Step S830). Herein, since the process of calculating the height from the reference surface using the difference value between the projected interference pattern and the reference interference pattern is the same as that of the aforementioned scanning type surface profile measuring method, the description thereof is omitted.

In the embodiment, during the measurement of the surface profile of the object, the reference interference pattern is scanned once, and the interference pattern projected on the surface of the object is photographed once. In the surface profilometer according to the present invention, since the dynamic interference patterns can be generated by using the Fabry-Perot resonator having a single light source and a single cell device, the surface profilometer can be produced so as to have a small size with low costs.

In addition, since the surface profilometer according to the present invention utilizes the electro-optic effect of the liquid crystal layer and the Fabry-Perot resonator without damage or destruction of the surface of the object, the measurement can be performed at a high speed. The surface profilometer having such features according to the present invention can be widely used in various application fields such as medical and image industries.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

An optical surface profilometer and optical surface profile measuring method according to the present invention can be widely used for medical imaging devices and test/analytical systems.

What is claimed is:

1. An optical surface profilometer comprising:
   a Fabry-Perot resonator into which liquid crystals are inserted;
   a light source which supplies coherent light to the Fabry-Perot resonator; and
   a convex lens which is disposed in an interference pattern emitting plane of the Fabry-Perot resonator,
   wherein the coherent light supplied from the light source is incident to the Fabry-Perot resonator,
   wherein, when the light is incident, the Fabry-Perot resonator emits an interference pattern generated in a resonance mode, and
   wherein the interference pattern is configured so that a number of circular fringes having the same center are disposed non-linearly.

2. The optical surface profilometer according to claim 1, wherein the Fabry-Perot resonator includes:
   a liquid crystal layer including first and second surfaces which face each other;
   a first vertical alignment layer, a first transparent electrode layer, a first dielectric reflection film, and a first substrate which are disposed on the first surface of the liquid crystal layer; and
   a second vertical alignment layer, a second transparent electrode layer, a second dielectric reflection film, and a second substrate which are disposed on the second surface of the liquid crystal layer.

3. The optical surface profilometer according to claim 2, wherein, between the first dielectric reflection film and the second dielectric reflection film, the liquid crystal layer, the first vertical alignment layer and the second vertical alignment layer are disposed, and at least one of the first substrate and the second substrate is deposed.

4. The optical surface profilometer according to claim 2, wherein a separation distance between the first dielectric reflection film and the second dielectric reflection film is determined according to a resolution required in the optical surface profilometer or a line width of the fringes of the interference pattern.

5. The optical surface profilometer according to claim 1, further comprising a power supply unit which applies a variable voltage to the Fabry-Perot resonator.

6. The optical surface profilometer according to claim 1, further comprising a polarizer which is disposed between the light source and the Fabry-Perot resonator.

7. The optical surface profilometer according to claim 1, wherein, when a voltage is applied to the Fabry-Perot resonator, a refractive index of the liquid crystal layer in the Fabry-Perot resonator is changed, so that a diameter of the interference pattern emitted from the Fabry-Perot resonator is changed.

8. The optical surface profilometer according to claim 1, further comprising an image pickup unit and a control module, wherein the control module drives the image pickup unit to photograph the interference pattern emitted from the Fabry-Perot resonator and projected to a reference surface to acquire a reference interference pattern, wherein, in a state where the reference interference pattern from the Fabry-Perot resonator is scanned on the surface of the object, the control module drives the image pickup unit to photograph the interference pattern projected on the surface of the object to acquire a projected interference pattern, wherein the control module compares the reference interference pattern and the projected interference pattern to detect distorted areas in which the projected interference patterns are different from the reference interference pattern, and wherein the control module obtains difference values between the projected interference pattern and the reference interference pattern in the detected distorted areas and extracts a surface profile of the object by using the difference values.

9. The optical surface profilometer according to claim 8, wherein the control module acquires the reference interference pattern by driving the image pickup unit to photograph the interference pattern in the state where a predetermined reference voltage is applied to the Fabry-Perot resonator or in the state where no voltage is applied thereto.

10. The optical surface profilometer according to claim 8, wherein the control module calculates heights of the distorted areas by using the difference values between the projected interference pattern and the reference interference pattern, which are obtained with respect to the distorted areas, and extracts the surface profile of the object according to the calculated heights of the distorted areas.

11. The optical surface profilometer according to claim 10, wherein the heights h of the distorted areas are calculated by the following equation, $$h = \Delta D_p \cot(D_{p,reference}/2f), \text{ and}$$

wherein $\Delta D_p = (D_{p,reference} - D_{p,measure})/2$; $D_{p,reference}$ is a diameter of the reference interference pattern; and $D_{p,measure}$ is a diameter of the projected interference pattern.

12. The optical surface profilometer according to claim 1, further comprising an image pickup unit and a control module, wherein the control module allows a plurality of voltages to be sequentially applied to the Fabry-Perot resonator and drives the image pickup unit to photograph the interference pattern emitted from the Fabry-Perot resonator and projected to a reference surface to acquire reference interference patterns, wherein the control module allows the reference interference patterns corresponding to the applied voltages to be sequentially scanned from the Fabry-Perot resonator on the surface of the object and drives the image pickup unit to photograph the interference pattern projected on the surface of the object to acquire projected interference patterns corresponding to the applied voltages, wherein the control module compares the reference interference pattern and the projected interference pattern with respect to each of the applied voltages to detect distorted areas in which the projected interference patterns are different from the reference interference pattern, and wherein the control module obtains difference values between the projected interference pattern and the reference interference pattern in the detected distorted areas and extracts a surface profile of the object by using the difference values.

13. The optical surface profilometer according to claim 12, wherein the control module calculates heights of the distorted areas by using the difference values between the projected interference pattern and the reference interference pattern, which are obtained with respect to the distorted areas, and extracts the surface profile of the object according to the calculated heights of the distorted areas.

14. The optical surface profilometer according to claim 12, wherein the plurality of the voltages applied to the Fabry-Perot resonator have values which are sequentially increased by a predetermined unit voltage from a reference voltage.

15. The optical surface profilometer according to claim 14, wherein the magnitude of the unit voltage is determined according to a resolution.

* * * * *